UNITED STATES PATENT OFFICE.

WARREN HENRY WHITE, OF TACOMA, WASHINGTON.

BEVERAGE EXTRACT.

1,276,298.  Specification of Letters Patent.  Patented Aug. 20, 1918.

No Drawing.  Application filed May 29, 1916.  Serial No. 100,669.

*To all whom it may concern:*

Be it known that I, WARREN HENRY WHITE, a citizen of the United States, residing at Tacoma, in the county of Pierce and State of Washington, have invented a new and useful Beverage Extract, of which the following is a specification.

This invention relates to improvements in beverage extracts and processes of making the same, and the object of this improvement is to produce a soluble granular beverage extract that is healthful and nutritious and possessed of a pleasant flavor and aroma. In producing this extract I use caramelized saccharine matter, some form of chocolate and an extract of cereals, or nut products, or vegetable products, or a combination of the three latter.

The above ingredients are combined in the manner and by the process hereinafter described to form a comminuted beverage extract that is readily soluble in water.

In carrying out my invention in its simplest form, I first take a mixture of cereals or grains, preferably wheat and bran, and add saccharine matter as molasses or sugar. This mass is then steamed, dried and roasted, the roasting being carried far enough to thoroughly caramelize the saccharine matter. The roasted product is then ground to a coarse powder and is mixed with another powder composed of a mixture of cereal products preferably wheat and bran that have been roasted to a dark brown and then ground. Water is then added and the product is heated to a moderate temperature to dissolve out the soluble extract, the heating operation preferably being carried out in a percolator or filter of any well known standard form of construction.

The extractive solution is then drawn off and cacao preparations as chocolate or cocoa, or a mixture of the two, is added and the solution is evaporated preferably in a vacuum to a point where it contains 30% or more of solid matter in solution.

To complete the evaporation the mixture is then preferably transferred to vacuum pans and the remaining moisture is evaporated, care being taken that overheating and scorching does not occur during the last stages of this process.

The product is then removed from the pans, is ground into flakes or powder or any finely divided comminuted condition and is stored in sealed cans or packages to make it ready for the market.

The above described process constitutes the most simple form of my invention but another discovery in the perfection of my invention consists in taking a mixture of cereals or grains, preferably wheat and bran, and a mixture of vegetable products, preferably peas, to this mixture a small proportion of nut products preferably peanuts is added in a proportion of about 7 parts cereals to 2 parts vegetables, and one part nut products, then adding the saccharine matter, steaming, drying, roasting and grinding as hereinbefore described; then mixing the ground product with a coarse powder composed of a mixture of roasted cereals, vegetables and nuts, adding water and subjecting the mass to the dissolving, evaporating, drying and grinding process hereinbefore described to make it ready for use. The resultant product is a beverage extract almost instantly soluble in hot water and having a very pleasant flavor of blended chocolate, cereals, vegetable and nuts.

By the use of the term "chocolate" throughout this specification I intend to include chocolate, cocoa or any other similar product of the cacao bean.

The apparatus in carrying out this process is of old and well known form and will not be described herein.

What I claim and desire to protect by Letters Patent, is:—

1. A solid soluble beverage extract comprising cacao products, pulverized extractive matter of a roasted cereal, peas, and caramelized saccharine matter.

2. A solid soluble beverage extract comprising cacao products, pulverized extractive matter of roasted cereals and nut products and caramelized molasses.

3. A solid soluble beverage extract comprising pulverized extractive matter of roasted cereals, peas, nut products, and caramelized saccharine matter.

4. A solid soluble beverage extract comprising cacao products, pulverized extractive matter of roasted wheat and bran, peas and nut products and caramelized saccharine matter.

5. A solid soluble beverage extract comprising cacao products, pulverized extractive matter of roasted wheat, bran, peas and peanuts, and caramelized molasses.

6. A solid soluble beverage extract comprising cacao products, pulverized extractive matter of roasted vegetable and nut products and caramelized saccharine matter.

7. A solid soluble beverage extract comprising pulverized extractive matter of roasted cereals, peas, and caramelized saccharine matter.

WARREN HENRY WHITE.

Witnesses:
E. G. DRAIN,
F. J. SCHAEFER.

Copies of this patent may be obtained for five cents each, by addressing the "Commissioner of Patents, Washington, D. C."